United States Patent [19]

Choi

[11] Patent Number: 5,590,113
[45] Date of Patent: Dec. 31, 1996

[54] DISC CLAMPING DEVICE FOR SELECTIVELY CLAMPING A COMPACT DISC IN A UNITED DEVICE

[75] Inventor: Youngsuk Choi, Seoul, Rep. of Korea

[73] Assignee: Daewoo Electronics Co., Ltd., Seoul, Rep. of Korea

[21] Appl. No.: 363,344

[22] Filed: Dec. 23, 1994

[30] Foreign Application Priority Data

Dec. 28, 1993 [KR] Rep. of Korea .................... 93-30146

[51] Int. Cl.⁶ .................... G11B 17/035; G11B 17/04; G11B 33/02
[52] U.S. Cl. .................... 369/270; 369/75.2; 369/77.2
[58] Field of Search .................... 369/270, 271, 369/282, 75.1, 75.2, 77.1, 77.2; 360/98.08, 99.05, 99.12

[56] References Cited

U.S. PATENT DOCUMENTS

| | | | |
|---|---|---|---|
| 4,479,210 | 10/1984 | Nakayama | 369/75.2 |
| 4,607,361 | 8/1986 | Schuitmaker et al. | 369/270 |
| 4,740,937 | 4/1988 | Watanabe | 369/270 |

FOREIGN PATENT DOCUMENTS 4-360056   12/1992   Japan .
5-242579   9/1993    Japan .
5-307822   11/1993   Japan .
5-303815   11/1993   Japan .
5-303816   11/1993   Japan .
6-275047   9/1994    Japan .

*Primary Examiner*—John H. Wolff
*Assistant Examiner*—David L. Ometz
*Attorney, Agent, or Firm*—Oliff & Berridge

[57] ABSTRACT

A disc clamping device of a compatible disc player, by which a mini disc or a compact disc can be selectively loaded on a single turntable clamps either the mini disc or the compact disc. The disc clamming device has a base plate including two side walls each having a reversed "L" shaped cut-out portion, a supporter extending upward, a clamper arm and a rotating body pivoting about a hinged shaft fastened to the supporter, an actuating rod projected through the lower end of the rotating body, a folded forward portion having a clamper mounted thereto; a moving plate having a arcuate portion defined in the lower corner of the rear end thereof, a rack gear, and a stepped cut portion formed in side thereof; a tray holder receiving a compact disc tray and a mini disc tray; and a loading device. Since the disc clamping device is simple in construction, stable operation is ensured and manufacturing cost is reduced. Clamping force of the clamper can be conveniently controlled by adjustment of the angle between the clamper arm and the rotating body.

5 Claims, 5 Drawing Sheets

DISC CLAMPING DEVICE FOR SELECTIVELY CLAMPING A COMPACT DISC IN A UNITED DEVICE

BACKGROUND OF THE INVENTION

1. Field of the Invention

The present invention relates to a disc clamping device. More particularly, the present invention relates no a disc clamping device for selectively clamping a compact disc in a united device on which a mini disc MD and a compact disc CD can be loaded.

2. Description of the Prior Art

A disc player can be classified into a mini disc player, a compact disc player, and a laser disc player in accordance with the kinds of the discs, such as a mini disc, a compact disc and a laser disc, which are loaded on the disc player. Recently, there have Dean brisk studies for developing compatible disc players which can load any of variously sized discs in a selective manner.

Particularly, the studies have been concentrated on a disc clamping device by which two kinds of discs can be selectively loaded, and by which particularly a compact disc and a laser disc can be selectively loaded on a single turn table.

U.S. Pat. No. 4,841,517 (issued to Kurihara et al.) discloses a clamping device by which a compact disc and a laser disc can be selectively loaded on a single turntable of a disc player. In the above clamping device, as shown in FIG. 5A, a first hub 14 is inserted into a center hole of a compact disc 12, and then compact disc 12 is clamped on a turntable 10 by means of a second hub 16. In the meantime, as shown in FIG. 5B, second hub 16 is inserted into a center hole of a laser disc 18, and then, laser disc 18 is clamped on turntable 10 by means of a clamper 19.

Meanwhile, U.S. Pat. No. 4,853,924 (issued to Takahashi et al.) discloses another disc clamping device by which a compact disc and a laser disc can be selectively loaded on a single turntable of a disc player. In the above device, as shown in FIG. 6A, when a compact disc 22 is loaded, a first conical portion 25a (having a small diameter) of a hub 25 is inserted into a center hole of compact disc 22, and a magnet 27 of a clamper head 29 presses down compact disc 22 by the magnetic forces generated between magnet 27 and a turntable 20. As shown in FIG. 6B, when a laser disc 23 is loaded, a second conical portion 25b (having a large diameter) of hub 25 is inserted into a center hole of laser disc 23, and the bottom surface of clamper head 29 directly presses down laser disc 23 against turntable 20.

The above described devices can be applied only to a disc player in which a compact disc and a laser disc can be selectively loaded. However, the devices can not be applied to a disc player in which a mini disc is used. The reason is that generally a mini disc cannot be loaded in a naked form but can be loaded in an encased state in a mini disc cartridge and the above described devices cannot clamp the mini disc cartridge.

Therefore, there has arisen a necessity for a clamping device which is capable of clamping a mini disc and another disc being larger than the mini disc, such as a compact disc and a laser disc, selectively. However, no prior art for such a device has been found as far as the inventor knows.

SUMMARY OF THE INVENTION

Accordingly, it is an object of the present invention to provide a compatible disc clamping device by which a mini disc and compact disc can be loaded.

Another object of the present invention is to provide a disc clamping device which is simple in structure.

To achieve the above object, the present invention provides a disc clamping device comprising:

a tray holder having first guide bars projecting from side walls thereof, the tray holder receiving a disc tray for loading a first naked disc thereon, and a cartridge tray for loading a second disc encased in a cartridge thereon and having a size smaller than that of the first naked disc;

a moving plate having both side portions for guiding the horizontal and inclined movement of the first guide bars, the side portions provided with a first stepped cut portion into which the first guide bar is inserted, a arcuate portion defined in the lower corner of the rear end of the moving plate, and a rack gear formed in the lower edge of the moving plate;

a base plate including two side walls, each side wall having a first reversed "L" shaped cut-out portion into which the first glide bar is inserted;

a loading means fixed to the base plate for driving the rack gear; and a clamping means having a supporter mounted to the rear end of the base plate, a clamper arm folded so as to pivot about a hinged shaft of the supporter, a rotating body integrally formed with the clamper arm and positioned between the clamper arm and the supporter, an actuating rod projected on the lower side surface of the rotating body, and a clamper mounted to a forward portion of the clamper arm folded at an angle to the rest of the clamper arm, the actuating rod being forced to pivot by the arcuate portion of the moving plate, so that the clamping means clamps the disc tray or the cartridge According to the clamping device of the present invention, when a disc tray and a cartridge tray are received in a tray holder, a loading means moves a moving plate through a rack gear. As the moving plate moves rearward, a guide bar is guided by a stepped cut portion and moves in horizontal and inclined directions, and the loading of the tray holder is completed. The moving plate continues to move to force the guide bar, by which a clamper is rotated to clamp the compact disc tray.

According to the present invention, a disc clamping device which can selectively load a mini disc and a compact disc is provided. Since the disc clamping device of the present invention is simple in construction, stable operation thereof is ensured and manufacturing cost is reduced. Also, clamping force of the clamper can be conveniently controlled by adjustment of the angle between the clamper arm and the rotating body.

BRIEF DESCRIPTION OF THE DRAWINGS

The above object, and other features and advantages of the present invention will be more apparent after a reading of the following detailed description taken in conjunction with the drawings, in which.

DESCRIPTION OF THE PREFERRED EMBODIMENT

Hereinafter, a disc clamping device in accordance with an embodiment of the present invention will be described with reference to the drawings. In the following descriptions, "forward" means the direction that a disc tray is discharged. Other directions are determined on the basis of the forward direction.

Figure 1:
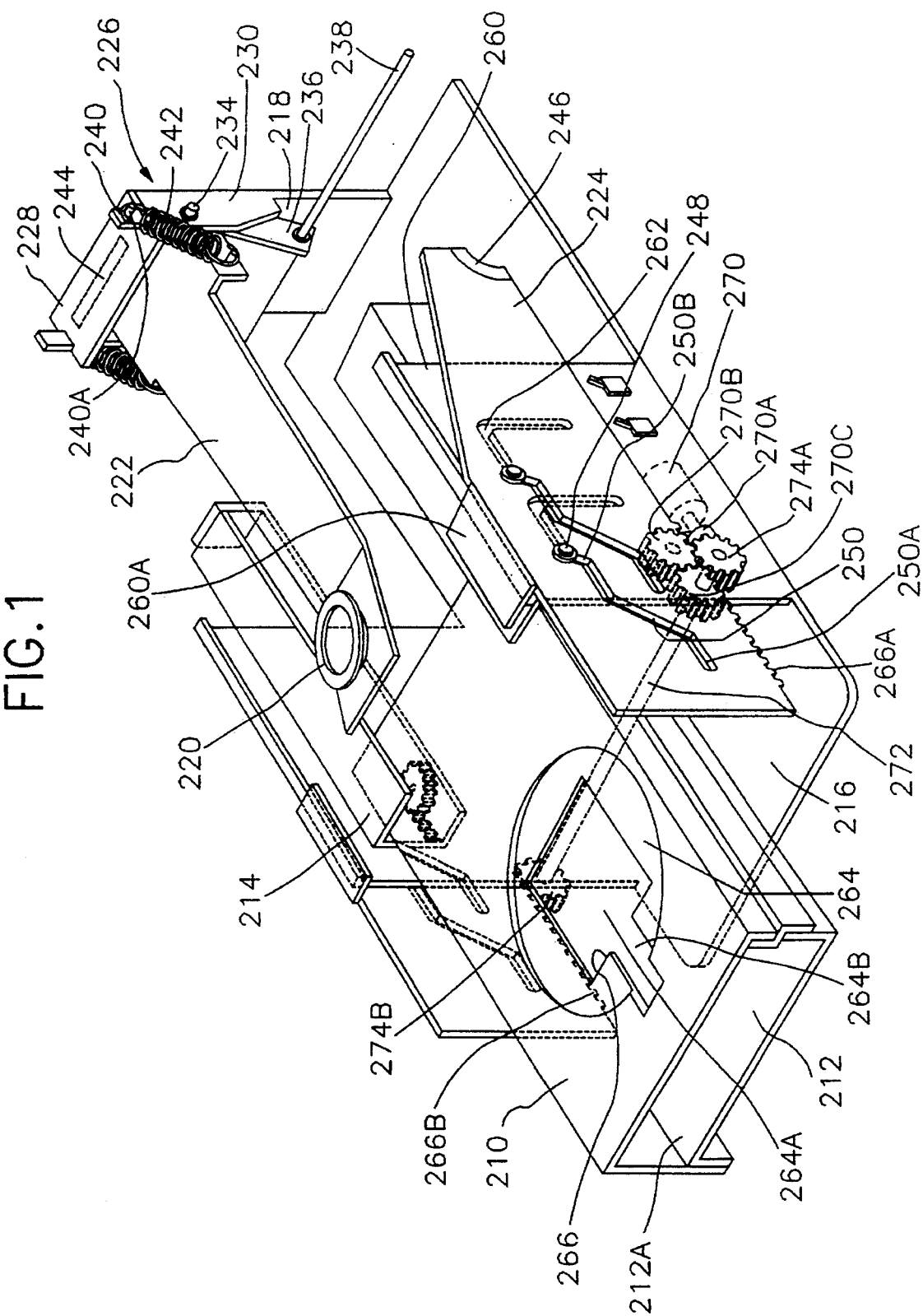
FIG. 1 is a perspective view of a disc clamping device in accordance with an embodiment of the present invention.

FIG. 1 is a perspective view of a disc clamping device in accordance with an embodiment of the present invention. As shown in FIG. 1, side walls 260 extend upward from both side edges of a base plate 216, and each of side walls 260 is provided with a first reversed "L" shaped cut-out hole 262. A supporter 218 extends vertically upward from a middle portion of the rear end of base plate 216. Side plates 230 extend forward from and ere folded at a right angle to both the side edges of supporter 218. A stopper 244 is folded forward from the upper edge of supporter 218 at a right angle thereto. Necking pins 240A are anchored on necking pieces 240 which are formed beyond stopper 244 by protruding an upper end portion of side plate 230. One end of a restoration spring 242 is fastened to each of necking pins 240A.

Between side plates 230 of supporter 218, there is provided a clamper arm 222 and a rotating body 236. Clamper arm 222 and rotating body 236 are pivotally mounted on side plates 230 by a hinged shaft 234 fitted through side plates 230. Hinged shaft 234 has a torsion spring 232 fixed therearound. The rotation of clamper arm 222 and rotating body 236 is limited to a certain level by stopper 244. An actuating rod 238 is fitted in the lower end of rotating body 236 and protrudes out therefrom. The free end of clamper arm 222 is folded upward at a certain angle, and a clamper 220 is mounted on the folded free end of clamper arm 222. The clamper 220 is used to clamp CD disc tray 210 in the CD and MD united player. The operation will be described below.

Moving plates 224 are positioned on the outside surfaces of side plates 260 of base plate 216. Guide plates 260A are formed incorporated with the upper part of moving plate 224 to guide the linear movement of moving plate 224. The upper edge of moving plate 224 is declined from the rear position of guide plate 260A to the rear end of moving plate 224. An arcuate portion 246 is provided in the lower corner of the rear edge of moving plate 224 to push rearward actuating rod 238 projected from rotating body 236. The lower edges moving plates 224 include racks 266A and 265B, respectively. Racks 265A and 266B are respectively engaged with transfer gears 274A and 274B provided on base plate The side wall of each moving plate 224 has a first stepped cut portion 250 formed therein. First stepped cut portion 250 includes a first parallel portion which is cut parallel to the upper surface of base plate 216, a first rising portion which is cut in a rising inclination to the first parallel portion, a second parallel portion which is cut parallel to the first parallel portion from the upper end the first rising portion, and a second rising portion which is cut parallel to the first rising portion from the rear end of the second parallel portion. Guide bars 248 are projected from both the outer surfaces of a tray holder 214, and inserted into first stepped cut portions 250. Therefore, tray holder 214 moves in horizontal or inclined directions along first stepped cut portion 250 according to the movement of moving plate 224. As shown in FIG. 1, it is preferable that moving plate 224 and base plate 216 further include a second reversed "n" shaped cut-out portion and a second stepped cut portion, respectively.

Each tray holder 214 includes a side wall, an upper plate and a lower plate by which a quadrilateral hole is defined. As described above, guide bar 248 is projected from the outer surface of the side wall of each tray holder 214, and inserted into first stepped cut portion 250 formed in moving plate 224. A combination of compact disc tray 210 and mini disc tray 212 is received in the quadrilateral hole.

compact disc tray 210 and mini disc tray 212 are integrally combined in the respective upper and lower positions. Compact disc tray 210 has a CD loading part 264. On the center portion of CD loading part 264, there is defined a quadrilateral hole 264A and a rectangular hole 264B which are communicated with each other. A pick-up (not shown) reads the information of compact disk and mini disc through quadrilateral hole 264A and rectangular hole 264B. An MD loading part 212A is provided between compact disc tray 210 and mini disc tray 212. Generally, there have been suggested and adopted many methods which pull the disc tray into the tray holder. An example provides a guide rack formed longitudinally on an inner surface of the tray holder and a gear rotatably secured to a shaft fixed to the compact disc tray and meshed with the guide rack. Then, when the tray holder moves, the disc tray moves along the guide rack.

The loading of moving plate 224 and tray holder 214 is controlled by a loading device, and the loading device includes a loading motor 270 for generating driving force, a worm gear 270A for transferring the driving force of loading motor 270, a first transmission gear 270B engaged with worm gear 270A for transferring the rotation force of worm gear 270A and a second transmission gear 270C engaged with first transmission gear 270B. The loading device further includes a transmission shaft 272 to which second transmission gear 270C is fixed, and transfer gears 274A and 274B which are fixed to both ends of transmission shaft 272.

The operation of the disc clamping device constructed as mentioned above, will be described in below.

Figure 2:
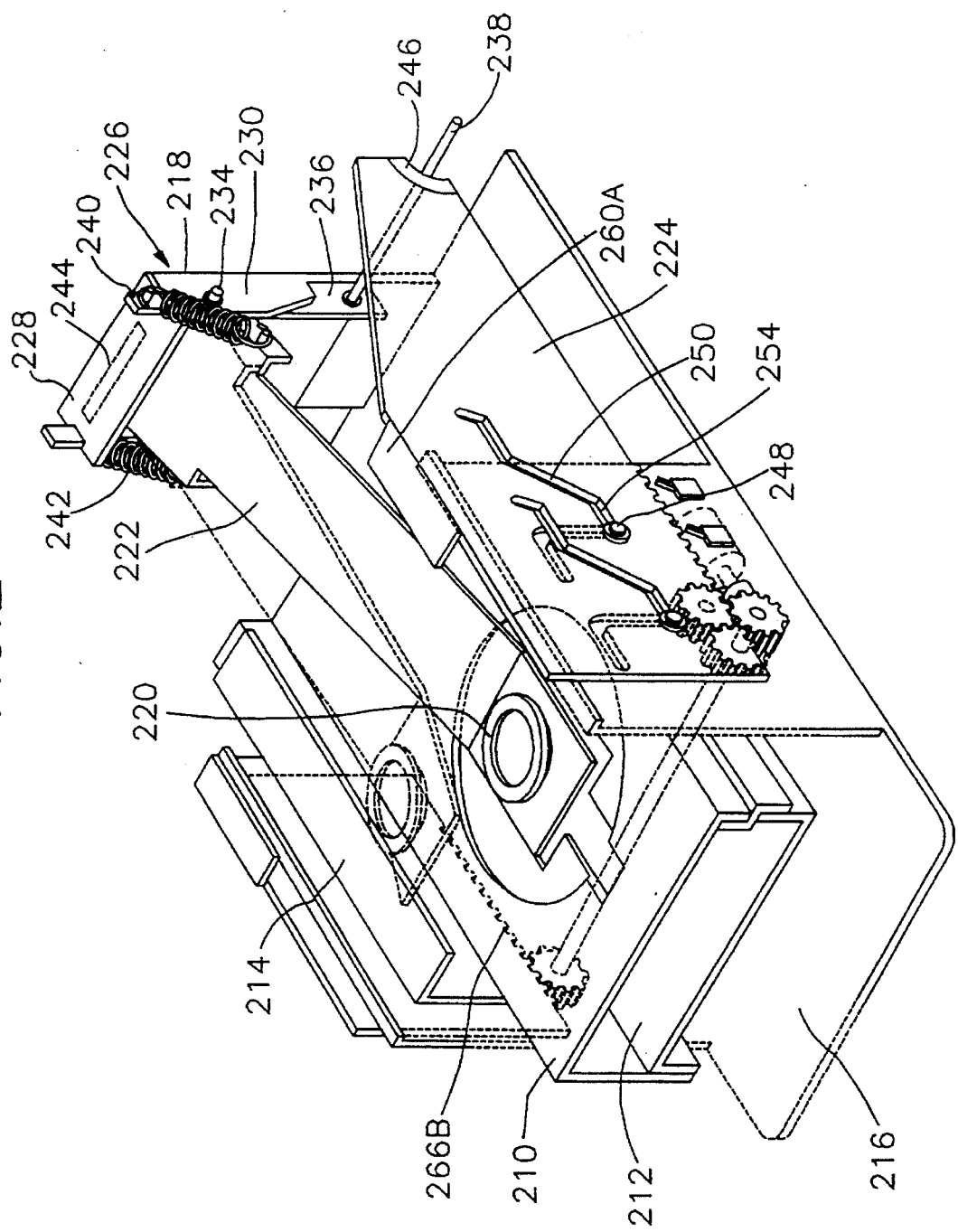
FIG. 2 is a perspective view of the disc clamping device shown in FIG. 1 in a clamping state thereof.

FIG. 2 is a perspective view of the disc clamping device shown in FIG. 1 when compact disc tray 210 was clamped.

As shown in FIG. 2, as compact disc tray 210 and mini disc tray 212 are loaded in tray holder 214, loading motor 270 rotates. The rotation force of loading motor 270 is transferred through worm gear 270A to first transmission gear 270B and second transmission gear 270C engaged with first transmission gear 270B, which in turn are rotated. Accordingly, transmission shaft 272 is rotated, and the rotation force of transfer gears 274A and 274B fixed to both ends of transmission shaft 272 is transferred to rack 266, by which moving plate 224 is moved toward the rear end of base plate 216. Then, guide bar 248 which is projected from the outer surface of tray holder 214 and inserted into first stepped cut portion 250 and first reversed "L" shaped cut-out portion 262 is moved along the parallel path of first reversed "L" shaped cut-out portion 262 according to the movement of moving plate 224. When guide bar 248 has arrived in the vertical path through the parallel path of first reversed shaped cut-out potion 262, guide bar 248 is not moved anymore in the parallel path. As moving plate 224 continues to move, guide bar 248 is moved downward along stepped cut portion 250. Tray holder 214 to which guide bar 248 is fixed and which includes compact disc tray 210 and mini disc tray 212, is moved along with guide bar 248. The mounting procedure of tray holder 214 is completed when guide bar 248 has arrived in the boundary point between first rising portion and first parallel portion of first stepped cut portion, but moving plate 224 can be moved still more. When moving plate 224 is moved more toward the rear end of base plate 216, arcuate portion 246 of moving plate 224 forces actuating rod 238 to move it rearward. As actuating rod 238 is forced by arcuate portion 246, rotating body 236 and clamping arm 222 are rotated about hinged shaft 234 which is provided in side plate 230 of supporter 218. Then, clamper 220 folded upward in the free end of clamper arm 222 is moved downward toward CD loading part 264. When the movement of moving plate 224 is completed, clamping operation of clamper 220 is also completed, and all loading procedure is ended. The folding angle of clamper 220 about clamping arm 222 is determined for maintaining clamper 220 in a parallel relation to CD loading part 264 when the rotation of clamper arm 222 is completed. FIG. 2 illustrates the state that loading of compact disc tray 210 and mini disc tray 212 is completed and clamping opera=ion is accomplished.

The ejecting procedure of tray holder will be described hereinafter.

Figure 3:
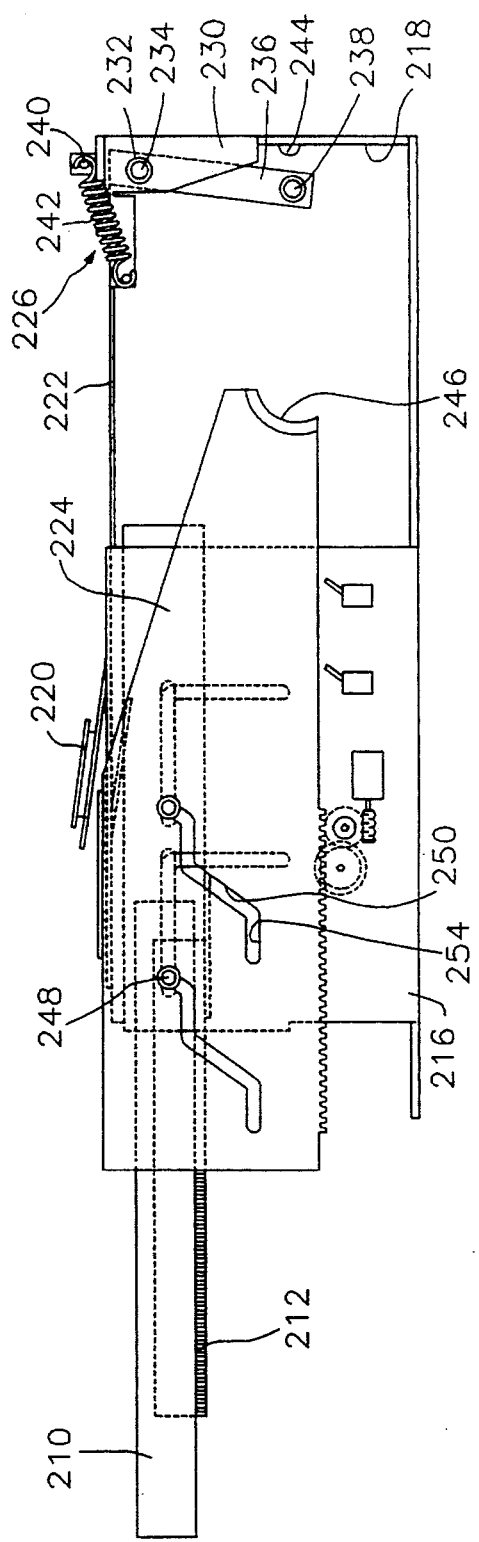
FIG. 3 is a side view of the disc clamping device of FIG. 1, in which a clamper is lifted.

FIG. 3 is a side view of the disc clamping device of FIG. 1, in which a clamper is lifted.

Loading motor 270 is rotated in an opposite direction in comparison with the rotation direction of that in loading tray holder. Moving plate 224 is moved forward to release arcuate portion 246 from guide bar 248. Clamping arm 222 and rotating body 236 are rotated by the elastic force of restoration spring 242 both ends of which are fastened to pin 240A and clamping arm 222 respectively. By the rotation of clamping arm 222, clamper 220 is moved upward for freeing the clamping condition. Stopper 244 folded forward from the upper edge of supporter 218, functions to limit the rotation of clamper arm 222.

Figure 4:
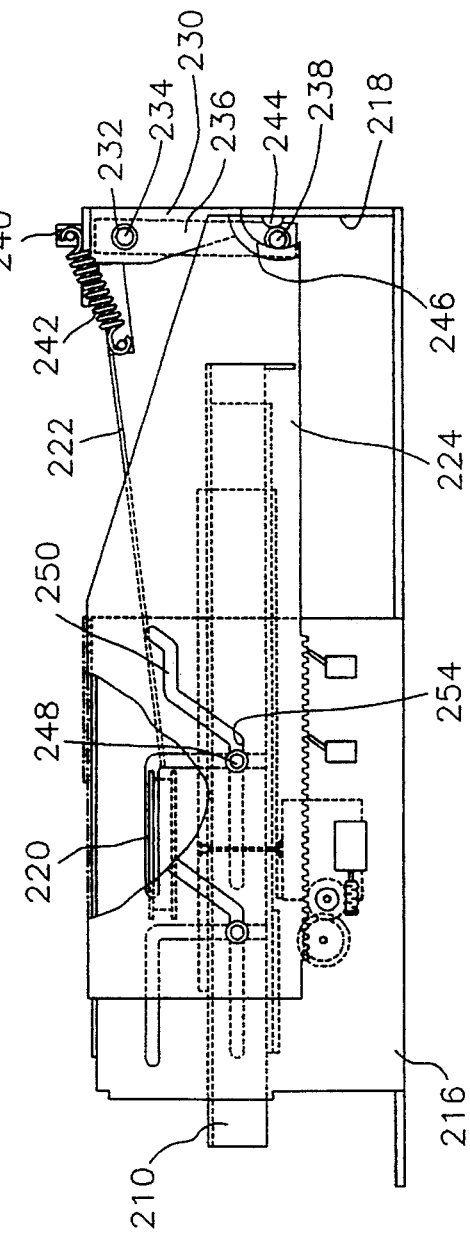
FIG. 4 is a side view of the disc clamping device of FIG. 2, in which the clamper is lowered.
Figure 5A:
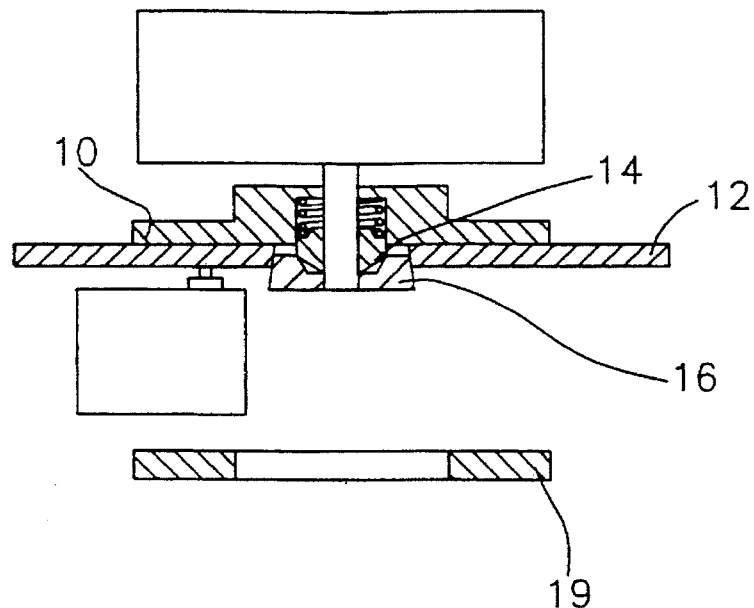
FIGS. 5A and 5B are schematic perspective views of a conventional disc clamping device, respectively in which a compact disc and a laser disc are loaded on a single turntable.
Figure 5B:
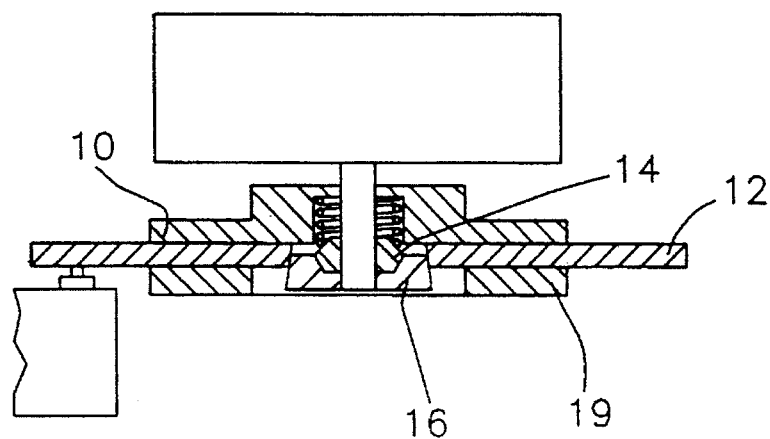
Figure 6A:
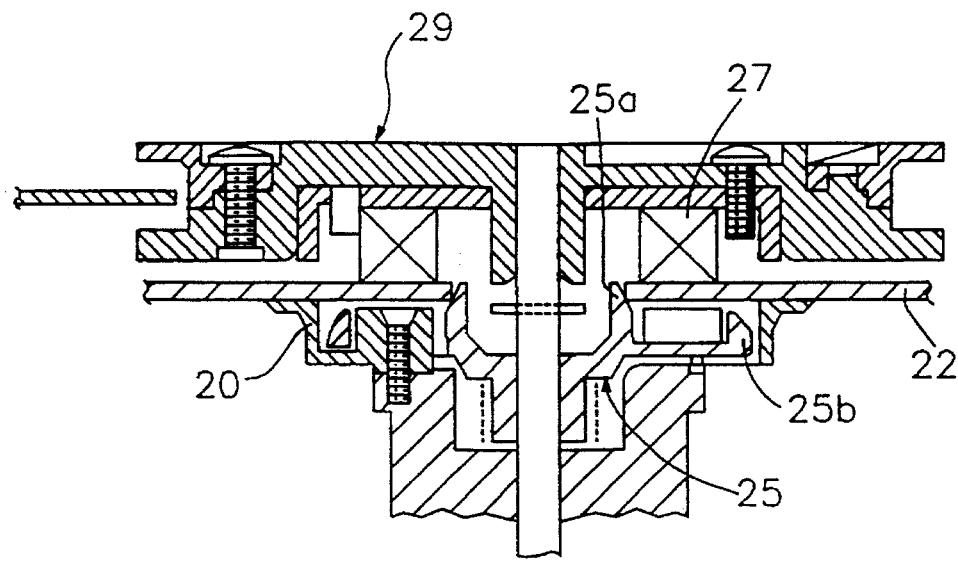
FIGS. 6A and 6B are schematic perspective views of another conventional disc clamping device, respectively in which a compact disc and a laser disc are loaded on a single turntable.
Figure 6B:
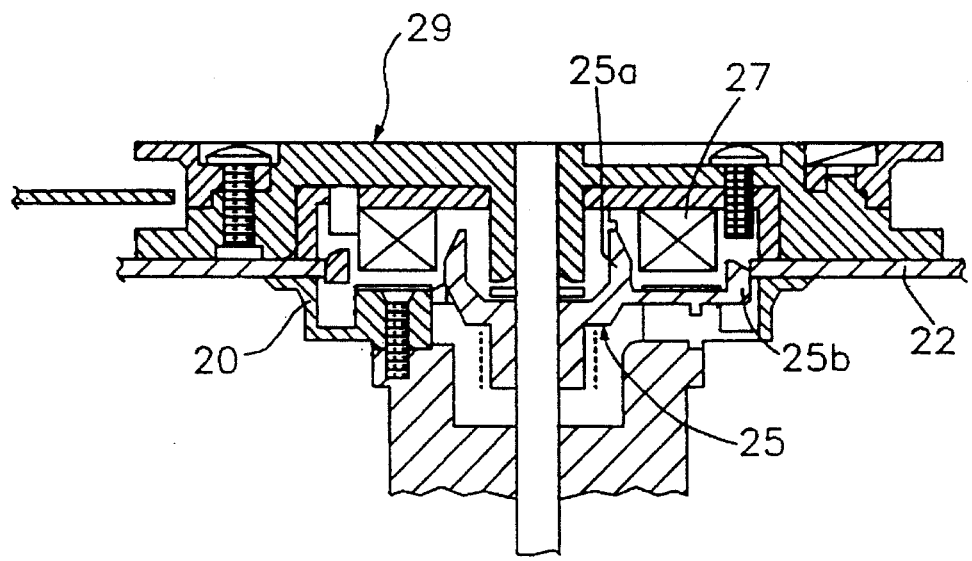

FIG. 4 is a side view of the disc clamping device of FIG. 2, in which the clamper is lowered.

As shown in FIG. 4, when moving plate 224 is moved to a rearmost position on base plate 216, arcuate portion 246 can push rearward guide bar 248 no further. At this tame, rotating body 236 must maintain the parallel relation with supporter 218. It is preferable that, by decreasing the angle between clamping arm 222 and rotating body 236 and using material having elasticity for clamping arm 222, clamper 220 can maintain a stable clamping condition.

As described above, according to the present invention, a disc clamping device which can alternatively load a mini disc and a compact disc is provided. Since the disc clamping device of the present invention is simple in structure, stable operation thereof is ensured and manufacturing cost is reduced. Also, clamping force of the clamper can be conveniently controlled by adjustment of the angle between the clamper arm and the rotating body.

Although the present invention has been described and illustrated with reference to the preferred embodiment, it is to be readily understood that the present invention is not limited to the preferred embodiment, and various changes and modifications can be made without departing from the scope and spirit of the invention defined in the appended claims.

What is claimed is:

1. A disc clamping device comprising:

a tray holder having first guide bars outwardly projecting from side walls thereof, said tray holder receiving a disc tray for loading a first naked disc thereon, and a cartridge tray for loading a second disc encased in a cartridge thereon and having a size smaller than that of said first naked disc;

a moving plate having side portions for guiding a horizontal and inclined movement of said first guide bars and a guide plate for guiding a linear movement of said moving plate, said side portions each provided with a first stepped cut portion into which said first guide bars are inserted, an arcuate portion defined in a lower corner of a rear end of said moving plate, a rack gear formed in a lower edge of said moving plate, and said guide plate formed incorporated with an upper part of said moving plate;

a base plate including two side walls, each of said side walls having a first reversed "L" shaped cut-out portion into which said first guide bars are inserted;

a loading means fixed to said base plate for driving said rack gear; and a clamping means having a supporter mounted to a rear end of said base plate, a clamper arm folded so as to pivot about a hinged shaft of said supporter, a rotating body integrally formed with said clamper arm and positioned between said clamper arm and said supporter, an actuating rod projected on a lower side surface of said rotating body, and a clamper mounted on a forward portion of said clamper arm folded at an angle to the rest of said clamper arm, said actuating rod being forced to pivot by said arcuate portion of said moving plate, so that said clamping means selectively clamps said first naked disc when said disc tray is loaded.

2. A disc clamping device as claimed in claim 1, wherein said moving plate has second stepped cut portions formed in said side portions thereof, said tray holder has second guide bars projected on the side walls thereof, and said base plate has second reversed "L" shaped cut-out portions formed in the side walls thereof.

3. A disc clamping device as claimed in claim 1, wherein said moving plate has an upper edge declined from a rear end of said guide plate to the rear end of said moving plate.

4. A disc clamping device as claimed in claim 1, wherein said clamper arm is comprised of an elastic material.

5. A disc clamping device comprising:

a tray holder having first guide bars and second guide bars outwardly projecting from side walls thereof, said tray holder receiving a disc tray for loading a first naked disc thereon, and a cartridge tray for loading a second disc encased in a cartridge thereon and having a size smaller than that of said first naked disc;

a moving plate having side portions for guiding a horizontal and inclined movement of said first guide bars and second guide bars and a guide plate for guiding a linear movement of said moving plate, said side portions provided with a first stepped cut portion and a second stepped cut portion into which said first guide bars and said second guide bars are inserted, an arcuate portion defined in a lower corner of a rear end of said moving plate, and a rack gear formed in a lower edge of said moving plate, and said guide plate formed incorporated with an upper part of said moving plate;

a base plate including two side walls, each of said side walls having a first reversed "L" shaped cut-out portion and a second reversed "L" shaped cut-out portion into which said first guide bars and said second guide bars are inserted;

a loading means fixed to said base plate for driving said rack gear; and a clamping means having a supporter mounted to a rear end of said base plate, a clamper arm made of elastic material and folded so as to pivot about a hinged shaft of said supporter, a rotating body integrally formed with said clamper arm and positioned between said clamper arm and said supporter, an actuating rod projected on a lower side surface of said rotating body, and a clamper mounted to a forward portion of said clamper arm folded at an angle to the rest of said clamper arm, said actuating rod being forced to pivot by said arcuate portion of said moving plate, so that said clamping means selectively clamps said first naked disc when said disc tray is loaded.

* * * * *